United States Patent [19]
Enneper

[11] Patent Number: 5,632,864
[45] Date of Patent: May 27, 1997

[54] SPLASH SHIELD FOR DISTILLATION UNIT

[75] Inventor: Brian J. Enneper, Perrysburg, Ohio

[73] Assignee: Kuss Corporation, Findlay, Ohio

[21] Appl. No.: 499,031

[22] Filed: Jul. 6, 1995

[51] Int. Cl.$^6$ .................................................. B01D 3/00
[52] U.S. Cl. .................. 202/197; 96/189; 159/DIG. 4; 159/DIG. 28; 202/182; 202/200; 202/264; 203/10; 203/20; 203/40
[58] Field of Search .......................... 202/200, 182, 202/264, 202, 197; 392/386, 394; 96/189; 203/40, 10, 20; 201/9; 55/474; 159/DIG. 4, DIG. 22, DIG. 28; 95/502, 525–527

[56] References Cited

U.S. PATENT DOCUMENTS

| | | | |
|---|---|---|---|
| 1,069,394 | 8/1913 | Gozzolino | 202/264 |
| 3,160,571 | 12/1964 | Mulford et al. | 202/173 |
| 3,161,574 | 12/1964 | Elam | 202/173 |
| 3,455,792 | 7/1969 | Ohta | 203/40 |
| 3,463,215 | 8/1969 | Pinkerton et al. | 159/DIG. 28 |
| 3,558,437 | 1/1971 | Metzger et al. | 202/200 |
| 3,743,780 | 7/1973 | Camp | 392/338 |
| 3,879,266 | 4/1975 | Sorensen | 202/236 |
| 3,887,665 | 6/1975 | Mix et al. | 202/158 |
| 4,045,293 | 8/1977 | Cooksley | 203/10 |
| 4,234,447 | 11/1980 | Hay, II et al. | 159/DIG. 12 |
| 4,957,672 | 9/1990 | Carter et al. | 264/45.5 |
| 5,039,486 | 8/1991 | Gordon | 210/249 |
| 5,200,039 | 4/1993 | Weber et al. | 202/197 |
| 5,337,703 | 8/1994 | Schlesh et al. | 392/386 |

FOREIGN PATENT DOCUMENTS

| | | | |
|---|---|---|---|
| 2046523 | 4/1972 | Germany | 202/173 |
| 0002620 | 2/1979 | Japan | 202/173 |

Primary Examiner—Virginia Manoharan
Attorney, Agent, or Firm—Brinks Hofer Gilson & Lione

[57] ABSTRACT

A splash shield for the boiler of a distillation type water purification apparatus includes at least two grades of porous media which cooperatively inhibit bubble formation and splashing, thereby preventing transfer of contaminants from the boiler water to the upper, interior surfaces of the boiler and into the distilled, contaminant free water. A first porous media is open cell reticulated foam having relatively large cells. Typically, at least a portion of the open cell foam is disposed above the operating liquid level of the boiler. The second porous media is fabric or screen having pores preferably smaller than about one thousand microns. The screen is disposed above the liquid level of the boiler. The open cell foam inhibits bubble production and breaks down bubbles and the screen intercepts drops and droplets that might otherwise travel to, contact and contaminate the upper boiler chamber surfaces and output to a condenser. The screen is preferably secured to a peripheral gasket which facilitates sealing engagement between the upper and lower halves of the boiler. The splash shield thus maintains the performance of the distillation unit and extends it service life.

16 Claims, 3 Drawing Sheets

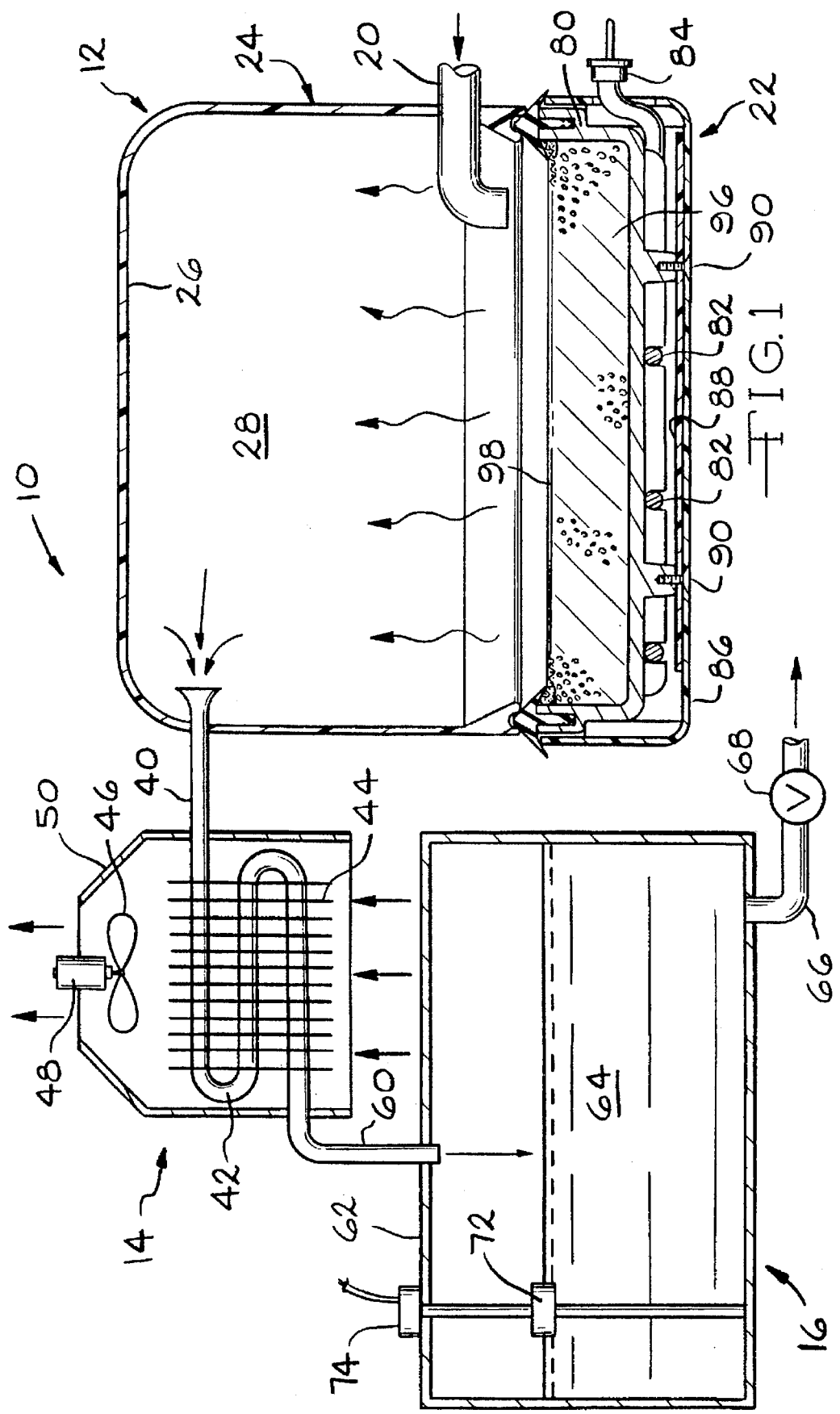

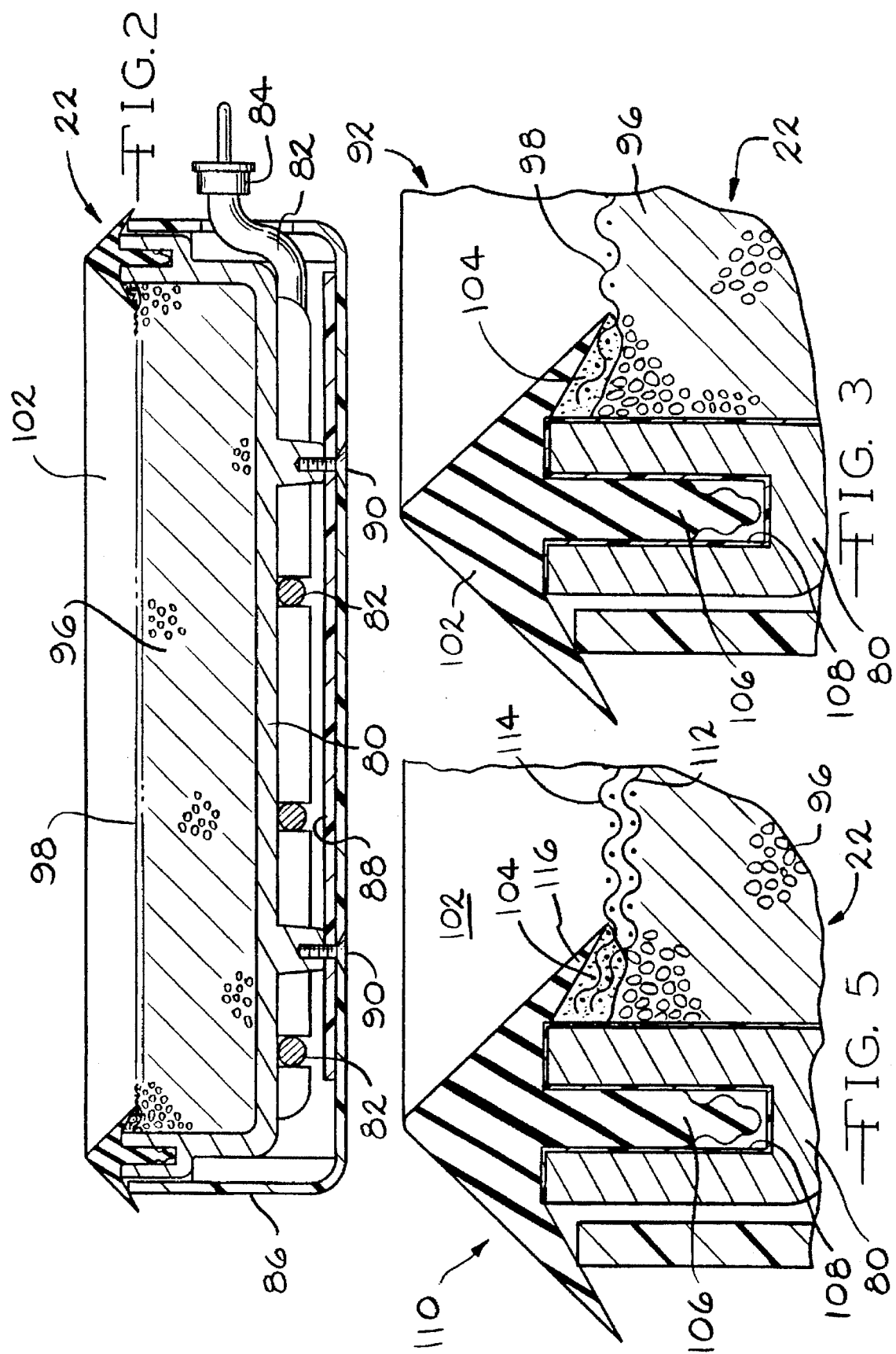

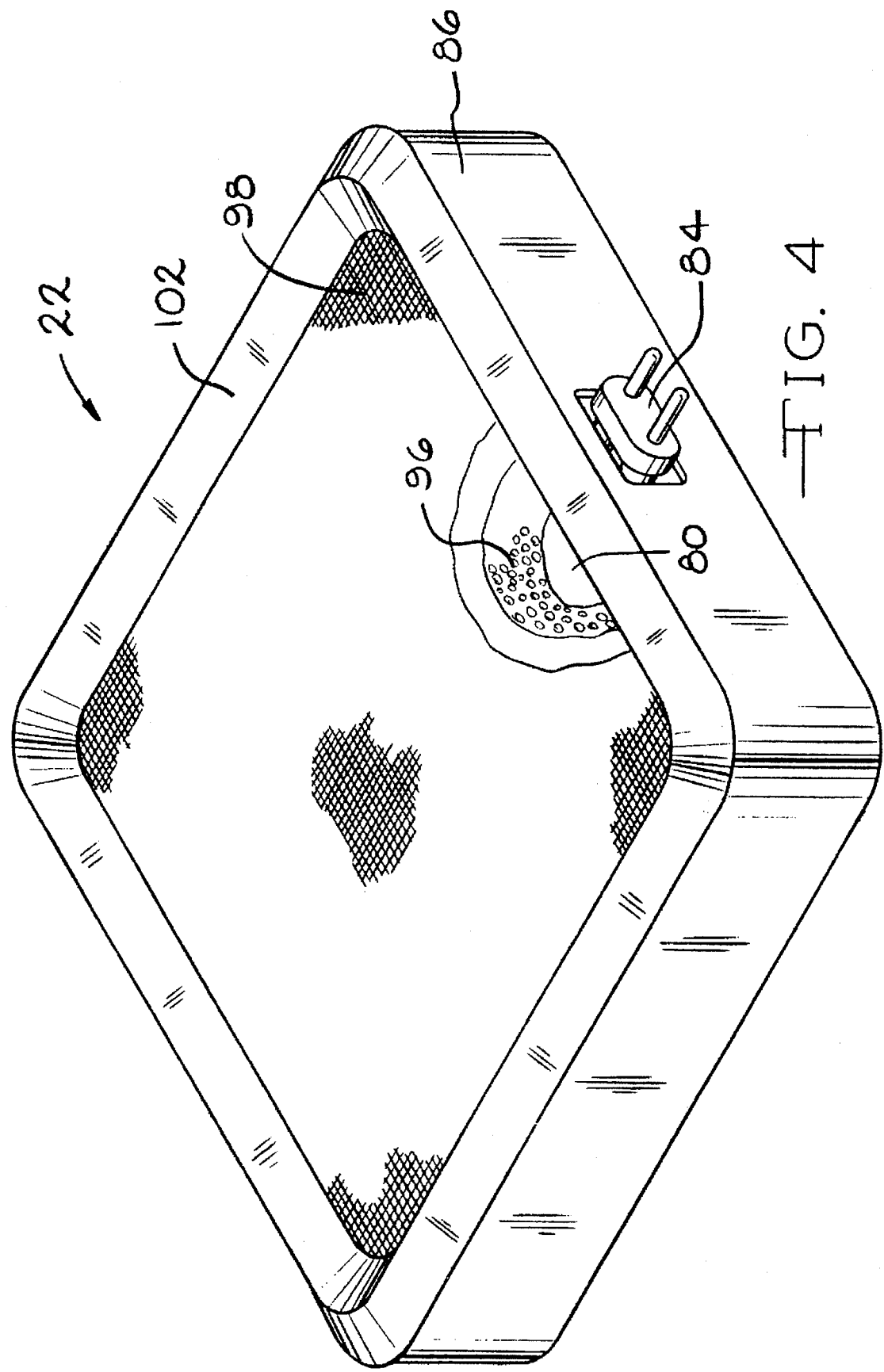

SPLASH SHIELD FOR DISTILLATION UNIT

BACKGROUND OF THE INVENTION

The invention relates generally to assemblies for use with water distillation boilers and more specifically to a splash shield for use in a water distillation boiler which inhibits splashing and thus the transfer of undistilled fluid to the upper interior surfaces of the boiler.

The purification of water through distillation remains one of the simplest and most effective processes of water purification. Although filtration, chemical catalysts and ionic separators may achieve desirable results on certain contaminants and in a more energy efficient manner, distillation, that is, the conversion of water to steam followed by its condensation provides a rapid, single step process for the removal of contaminants.

Water contaminants can generally be classified into three groups: particulate or foreign matter, biological agents such as microorganisms, algae and bacteria and chemical agents such as chlorine, fluoride and dissolved salts and minerals. Generally speaking, dedicated or specifically designed apparatus are necessary in order to remove each of the three classes of contaminants from water. Filtration devices remove particulate matter, ionic exchange or osmosis devices are effective against chemical and mineral contaminants and chemical agents may be utilized to eliminate plant life and microorganisms. Of course, after such treatment, the chemicals must then be removed.

Because of the universality of the distillation process, that is, the fact that it removes particulate, biological and chemical contaminants, as well as the mechanically straightforward nature of distillation equipment, this process is utilized in numerous relatively low volume residential and commercial water purification units.

Such units typically include a boiler which may be operated on a batch or continuous basis to heat water and convert it to steam. A condenser in communication with the boiler returns the steam to a liquid state and a reservoir stores the distilled water, ready for use.

Due to the relatively small size of such units and the boilers disposed therein, a difficulty has been detected. In order to provide reasonable distillate throughput, heat input and thus boiling in the boiler must be reasonably vigorous. Such boiling typically results in the generation of bubbles and, in turn, the splashing of water droplets onto the upper, interior surfaces of the boiler. Since such fluid transfer occurs directly, that is, without the boiling and condensation of the water, it also transfers contaminants from the undistilled water. Thus, the interior surface of the boiler will become contaminated with substances from the undistilled water and such contaminants may also be drawn along with the steam into the condenser and ultimately into the distilled water reservoir. Such contamination of the boiler surfaces, of course, only worsens with time and eventually interferes with proper operation of the distillation apparatus.

It is therefore apparent that in order to deliver high quality distilled water in a small batch or low volume continuous distillation apparatus, maintain the compact size of such units and provide appropriately lengthy service life, it is necessary to eliminate the transfer of liquid water from the boiler to the upper interior boiler surfaces to avoid contamination thereof.

SUMMARY OF THE INVENTION

A splash shield for the boiler of a distillation type water purification apparatus includes at least two grades of porous media which cooperatively inhibit bubble formation and splashing, thereby preventing transfer of contaminants from the boiler water to the upper, interior surfaces of the boiler and into the distilled, contaminant free water. A first porous media is open cell reticulated foam having relatively large cells. Typically, at least a portion of the open cell foam is disposed above the operating liquid level of the boiler. The second porous media is a fabric, screen or cloth having pores preferably smaller than about one thousand microns. The screen is disposed above the nominal liquid level of the boiler. The open cell foam inhibits and interferes with bubble production and breaks down bubbles. The screen intercepts drops and droplets that might otherwise travel to, contact and contaminate the upper boiler chamber surfaces and the output to a condenser. The screen is preferably secured to a peripheral gasket which achieves sealing engagement between the upper and lower halves of the boiler. The splash shield thus maintains the performance of the distillation unit and extends its service life.

An alternate embodiment splash shield includes a first open cell foam media and two adjacent fabric, cloth or mesh screens disposed on the upper surface of the foam.

It is thus an object of the present invention to provide a water distillation apparatus in which upper boiler surface contamination is substantially eliminated.

It is a further object of the present invention to provide a distillation apparatus wherein the purity of the distilled fluid is not compromised by contaminants carried by splashing generated by the boiling liquid.

It is a still further object of the present invention to provide a bubble and splash inhibiting device having two porous media for use in a distillation apparatus.

It is a still further object of the present invention to provide a bubble and splash inhibiting device having an integrally formed gasket which may be readily replaced as a unit.

It is a still further object of the present invention to provide a splash shield having open cell foam and two adjacent fabric layers disposed on the upper surface of the foam.

Further objects and advantages of the present invention will become apparent by reference to the following description of the preferred and alternate embodiments and appended drawings wherein like reference numerals refer to the same component, element or feature.

BRIEF DESCRIPTION OF THE DRAWINGS

FIG. 1 is a diagrammatic view of a batch type or continuous water distillation apparatus incorporating the present invention;

FIG. 2 is an enlarged, full sectional view of a water distillation boiler a splash inhibitor according to the present invention;

FIG. 3 is an enlarged, fragmentary sectional view of a preferred embodiment splash inhibitor according to the present invention, FIG. 4 is a perspective view of a water distillation boiler having a splash inhibitor according to the present invention; and FIG. 5 is an enlarged, fragmentary sectional view of a first alternate embodiment splash inhibitor according to the present invention.

DESCRIPTION OF THE PREFERRED AND ALTERNATE EMBODIMENTS

Turning now to FIG. 1, a water distillation apparatus incorporating the present invention is illustrated and generally designated by the reference numeral 10. The water distillation apparatus 10 includes a boiler assembly 12, a condenser assembly 14 and a distilled water reservoir assembly 16. The boiler assembly 12 includes a water inlet conduit 20 which may intermittently or continuously provide contaminated, undistilled water, i.e., distilland, to the boiler assembly 12. The boiler assembly 12 also includes a lower boiler housing 22 and an upper boiler housing 24 having an interior surface 26 which defines a steam chamber 28. Steam and water vapor in the chamber 28 are collected by and pass through an outlet conduit 40 which communicates with the condenser assembly 14. The condenser assembly 14 includes a heat exchanger 42 having a plurality of spaced apart heat transferring fins 44 or analogous heat transferring structures and a fan 46 preferably driven by an electric motor 48, all of which are disposed in a cowling or shroud 50. Ambient air is moved by the fan 46 over the fins 44 to condense water in the conduit 40 of the heat exchanger 42 thereby providing condensed, distilled water, i.e., distillate, to the reservoir assembly 16 through a conduit 60.

The reservoir assembly 16 defines a covered or protected container 62 which is capable of storing a desired amount of distilled water 64. An outlet conduit 66 communicates with the interior of the container 62, preferably on its bottom, thereby facilitating withdrawal of distilled water 64 from the container 62 of the reservoir assembly 16 and includes a valve 68 which may be either manually or electrically operated to open and close and provide a controlled flow of distilled water 64 as will be readily appreciated. The reservoir assembly 16 may also include a float assembly 72 and suitable normally closed electrical switch 74 which, when the container 62 is substantially filled with distilled water 64, opens and terminates the supply of electrical energy to the related components of the distillation apparatus 10 to inhibit further operation.

Turning now to FIGS. 2, 3 and 4, the lower boiler housing 22 is seen to include a boiler tray or chamber 80 which is preferably fabricated of metal. A sinuous electric heating coil 82 is disposed in intimate contact with the bottom wall of the boiler chamber 80 and provides heat energy thereto. The electric heating coil 82 terminates in a male electrical connector 84. A decorative and protective cover 86 preferably includes a heat shield 88 and is secured to the boiler chamber 80 by suitable fasteners such as the pair of threaded fasteners 90.

A preferred embodiment splash shield 92 is disposed in the boiler chamber 80 and preferably occupies substantially its full volume. The splash shield 92 includes a body or insert 96 of open cell, reticulated urethane foam having on the order of ten to twenty cells per inch (four to eight cells per centimeter). The composition of the urethane foam should be such that it is stable and provides good service life at temperatures slightly above the boiling temperature of water, 212° F. (100° C.). For example, it should preferably exhibit a melting temperature of at least 250° F. (128° C.). It will be appreciated that if the distillation apparatus 10 is utilized with fluids other than water having diverse boiling temperatures, the material from which the open cell foam body or insert 96 is fabricated should exhibit a melting temperature sufficiently above the boiling temperature of the fluid with which it is to be used such that it will likewise be stable and provide good service life at this temperature.

The water level in the boiler chamber 80 during operation is preferably in approximately the middle of the thickness (height) of the reticulated foam body or insert 96 and, in any event, below the upper surface of the foam insert 96. The reticulated foam body or insert 96 interferes with the formation of steam filled bubbles, breaks down large, steam filled bubbles and dissipates the kinetic energy contained therein, thereby minimizing the splashing of water into the chamber 28 and specifically onto the interior surfaces 26 of the chamber 28.

On the upper surface of the reticulated foam insert 96 is a single layer of square weave plastic fabric, cloth or screen 98. Preferably, the fabric or screen 98 is woven of polyester thread and has pores or openings in the range of from 200 to 500 microns and in any event smaller than about 1000 microns. Other comparable synthetic materials may also be utilized to weave the screen 98. The material from which the screen 98 is fabricated should exhibit an appropriate melting point and other service characteristics compatible with the distilland. The fabric or screen 98 cooperates with the reticulated foam insert 96 to further break down bubbles and dissipate kinetic energy in the water, intercept water droplets and collect contaminant laden water which might otherwise be erupted or splashed from the contaminated, undistilled water in the boiler chamber 80, contaminate the interior surfaces 26 of the chamber 28, possibly travel into the outlet conduit 40 and eventually into the reservoir assembly 16.

The splash shield 92 also preferably includes a peripheral elastomeric gasket 102 having a broad V-shaped or arrow shaped cross section. The fabric or screen 98 is preferably secured to the gasket 102 by a temperature stable, water impervious adhesive 104. Thus, the gasket 102 and fabric or screen 98 preferably form an integral assembly which may be readily removed and replaced should deterioration of either component require it. (The foam body or insert 96 may also, of course, be replaced at the same time, if desired.)

The gasket 102 extends about the periphery of the boiler chamber 80. The gasket 102 is especially configured to seat against the lower rim of the upper boiler housing 24 as will be readily appreciated. The gasket 102 includes a centrally disposed ribbed web 106 which is snugly and sealingly received within a complementarily sized, smooth wall channel 108 which extends about the upper periphery of the boiler chamber 80. A releasable clamping mechanism (not illustrated) positions and secures the lower boiler housing 22 to the upper boiler housing 24.

Turning now to FIG. 5, a first alternate embodiment of the splash shield according to the present invention is illustrated and generally designated by the reference numeral 110. The first alternate embodiment splash shield 110 is similarly located within the boiler chamber 80 of the lower boiler housing 22. Similarly, the first alternate embodiment splash shield 110 includes a body or insert of reticulated, open cell polyurethane foam 96 having the same approximate range of pore sizes, namely, 10 to 20 pores per inch (4 to 8 pores per centimeter), as the preferred embodiment foam body or insert 96. Likewise, an elastomeric gasket 102 having a generally broad, V or arrow shaped cross section, as illustrated, includes a centrally disposed ribbed web 106 which seats within a complementary reentrant channel 108 formed in the periphery of the boiler chamber 80.

In the first alternate embodiment splash shield assembly 110, two layers of fabric are disposed upon the foam body or insert 96. A first layer of fabric, cloth or screen 112 is disposed adjacent the upper surface of the foam insert or body 96 and defines a pore size preferably in the range of from 300 microns to 600 microns but preferably not larger than 1000 microns. A second layer of fabric, cloth or screen 114 disposed on top of and immediately adjacent the first fabric layer 112 preferably defines a pore size smaller than that of the first fabric layer 112. That is, the pore pores in the fabric layer 114 is preferably in the range of from 200 to 500 microns. For example, suitable combinations of pore sizes are 600 and 300 microns or 500 and 250 microns or 750 and 400 microns. Both of the fabric layers 112 and 114 are secured to an overhanging lip or flange 116 of the elastomeric gasket 102 by a bead of a suitable stable, water impervious adhesive 104. Thus, it will be understood that the first alternate embodiment splash shield 110 is quite similar to the preferred embodiment splash shield 92 but for the addition of a second fabric layer and the gradation of pore size, the first layer 112 having a generally larger pore size near the upper end of the range of pore sizes for the preferred embodiment and the second fabric layer 114 having a second, smaller pore size generally closer to the lower end of the range of pore sizes for the preferred embodiment.

It will be appreciated that although the foregoing description relates to a splash shield disposed in and utilized with distillation apparatus for water, the splash shield is equally effective and useful in apparatus intended for distillation of other liquids and fluids.

The foregoing disclosure is the best mode devised by the inventor for practicing this invention. It is apparent, however, that devices incorporating modifications and variations will be obvious to one skilled in the art of distillation apparatus not processes. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A splash inhibitor of porous media for use in a distillation apparatus comprising, in combination, a body of open cell foam, said foam having an upper surface, and a layer of screen disposed on said upper surface, said screen having a periphery and a pore size in the range of about 200 microns to 1000 microns, a boiler, means for providing heat to the boiler, an upper boiler housing, and a gasket disposed between said boiler and said upper boiler housing, wherein said body of foam and said layer of screen are disposed in the boiler of the distillation apparatus.

2. The splash inhibitor of claim 1 wherein said open cell foam has between about 10 to 20 cells per lineal inch.

3. The splash inhibitor of claim 1 further including a second layer of screen disposed adjacent said layer of fabric.

4. The splash inhibitor of claim 1 wherein said distillation apparatus further includes a condenser in communication with said upper boiler housing and a reservoir.

5. The splash inhibitor of claim 1 wherein said screen is secured to said gasket by an adhesive.

6. The splash inhibitor of claim 1 wherein said pore size of said screen is in the range of about 200 microns to 500 microns.

7. A splash shield for a boiler assembly of a distillation apparatus comprising, in combination, a boiler having a region for receiving distilland, an open cell foam body disposed in said boiler region having an upper surface, a mesh fabric disposed adjacent said upper surface of said foam body said mesh fabric having a pore size of less than about 1000 microns, and a gasket encircling said mesh fabric.

8. The splash shield of claim 7 wherein said boiler defines a peripheral channel and said gasket includes a web engageable within said channel.

9. The splash shield of claim 7 wherein said open cell foam body has between about 10 to 20 cells per inch.

10. The splash shield of claim 7 further including means for providing heat energy to said boiler, an upper boiler housing, a condenser in communication with said upper boiler housing and a reservoir.

11. The splash shield of claim 7 further including a second mesh fabric disposed between said mesh fabric and said open cell foam body.

12. The splash shield of claim 11 wherein said second mesh fabric has a pore size of less than about 1000 microns and said mesh fabric has a pore size of less than about 500 microns.

13. A splash inhibitor for use in a boiler of a water distillation apparatus comprising, in combination, a body of open cell foam, said foam having an upper surface, a layer of mesh fabric disposed on said surface, said layer defining a periphery and said fabric having a pore size in the range of about 200 microns to 1000 microns, and a gasket extending about said periphery of said fabric wherein said body of foam and said layer of fabric are disposed in a boiler of a water distillation apparatus.

14. The splash inhibitor of claim 13 wherein said open cell foam has between about 10 to 20 cells per lineal inch.

15. The splash inhibitor of claim 13 further including a second layer of fabric disposed adjacent said layer of mesh fabric.

16. The splash inhibitor of claim 13 wherein said pore size of said fabric is in the range of about 200 microns to 500 microns.

* * * * *